(12) United States Patent
Yang

(10) Patent No.: US 11,928,595 B2
(45) Date of Patent: *Mar. 12, 2024

(54) METHOD OF MANAGING DATA REPRESENTATION FOR DEEP LEARNING, METHOD OF PROCESSING DATA FOR DEEP LEARNING AND DEEP LEARNING SYSTEM PERFORMING THE SAME

(71) Applicant: SAMSUNG ELECTRONICS CO., LTD., Suwon-si (KR)

(72) Inventor: Seung-Soo Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,720

(22) Filed: May 24, 2022

(65) Prior Publication Data

US 2022/0292354 A1    Sep. 15, 2022

Related U.S. Application Data

(63) Continuation of application No. 16/265,221, filed on Feb. 1, 2019, now Pat. No. 11,348,004.

(30) Foreign Application Priority Data

Jul. 19, 2018 (KR) ........................ 10-2018-0083807

(51) Int. Cl.
*G06F 9/46* (2006.01)
*G06F 9/48* (2006.01)
(Continued)

(52) U.S. Cl.
CPC ............. *G06N 3/08* (2013.01); *G06F 9/4881* (2013.01); *G06F 9/5044* (2013.01); *G06F 9/5066* (2013.01); *G06N 20/00* (2019.01)

(58) Field of Classification Search
CPC ..... G06F 9/4881; G06F 9/5044; G06F 9/5066
See application file for complete search history.

(56) References Cited

U.S. PATENT DOCUMENTS 7,548,892 B2    6/2009   Buck et al.
8,082,539 B1   12/2011   Schelkogonov et al.
(Continued)

FOREIGN PATENT DOCUMENTS

CN    107203424 A  *  9/2017  ........... G06F 9/4881
KR    10-1818936        1/2018

OTHER PUBLICATIONS

Notice of Allowance dated Jan. 26, 2022 in corresponding U.S. Appl. No. 16/265,221.

*Primary Examiner* — Diem K Cao
(74) *Attorney, Agent, or Firm* — F. Chau & Associates, LLC

(57) ABSTRACT

A method of processing data for a deep learning system driven by a plurality of heterogeneous resources is provided. The method includes, when a first task including at least one of a plurality of operations is to be performed, receiving first path information indicating a first computing path for the first task. The first computing path includes a sequence of operations included in the first task and a driving sequence of resources for performing the operations included in the first task. The method further includes setting data representation formats of the resources for performing the operations included in the first task based on data representation information and the first path information. The data representation information indicates an optimized data representation format for each of the plurality of heterogeneous resources.

20 Claims, 17 Drawing Sheets

(51) Int. Cl.
    *G06F 9/50*     (2006.01)
    *G06N 3/08*     (2023.01)
    *G06N 20/00*     (2019.01)

(56) References Cited

U.S. PATENT DOCUMENTS

| | | |
|---|---|---|
| 8,160,852 B2 | 4/2012 | Bowers |
| 8,181,156 B1 | 5/2012 | Bobykin et al. |
| 8,818,066 B2 | 8/2014 | Battle et al. |
| 8,918,305 B2 | 12/2014 | Bowers |
| 9,049,245 B2 | 6/2015 | Higgins et al. |
| 9,794,136 B1 * | 10/2017 | Fakhouri ............ H04L 41/0897 |
| 2017/0017576 A1 | 1/2017 | Cammarota et al. |
| 2017/0323224 A1 | 11/2017 | Bruestle et al. |
| 2018/0046905 A1 | 2/2018 | Li et al. |
| 2018/0285011 A1 | 10/2018 | Ma et al. |
| 2020/0026997 A1 | 1/2020 | Yang |

\* cited by examiner

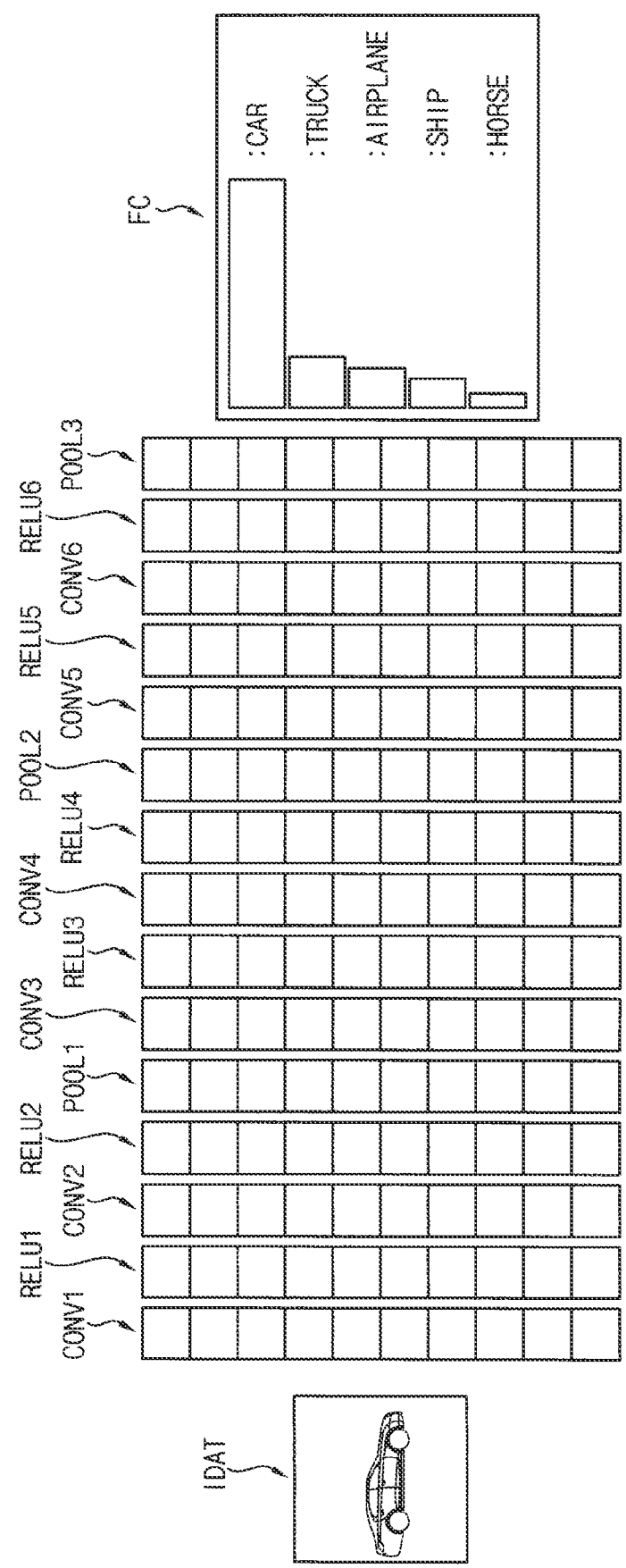

METHOD OF MANAGING DATA REPRESENTATION FOR DEEP LEARNING, METHOD OF PROCESSING DATA FOR DEEP LEARNING AND DEEP LEARNING SYSTEM PERFORMING THE SAME

CROSS-REFERENCE TO RELATED APPLICATION

This U.S. non-provisional application is a continuation application of U.S. patent application Ser. No. 16/265,221 filed Feb. 1, 2019, which claims priority under 35 USC § 119 to Korean Patent Application No. 10-2018-0083807, filed on Jul. 19, 2018 in the Korean Intellectual Property Office (KIPO), the disclosures of which are incorporated by reference in their entirety herein.

BACKGROUND

1. Technical Field

Exemplary embodiments relate generally to machine learning techniques, and more particularly to methods of managing data representation for deep learning, methods of processing data for deep learning, and deep learning systems performing the methods of managing data representation and the methods of processing data.

2. Discussion of Related Art

There are various methods of classifying data based on machine learning. Among them, a method of classifying data using a neural network or an artificial neural network (ANN) is one example. The ANN is obtained by engineering a cell structure model of a human brain where a process of efficiently recognizing a pattern is performed. The ANN refers to a calculation model that is based on software or hardware and is designed to imitate biological calculation abilities by applying many artificial neurons interconnected through connection lines. The human brain consists of neurons that are basic units of a nerve, and encrypts or decrypts information according to different types of dense connections between these neurons. Artificial neurons in the ANN are obtained through simplification of biological neuron functionality. The ANN performs a cognition or learning process by interconnecting the artificial neurons having connection intensities. Recently, deep learning processes and services have been researched to overcome limitations of the ANN.

SUMMARY

At least one exemplary embodiment of the present inventive concept provides a method of dynamically managing a data representation in a deep learning system that is driven by a plurality of heterogeneous resources.

At least one exemplary embodiment of the present inventive concept provides a method of efficiently processing data in a deep learning system that is driven by a plurality of heterogeneous resources.

At least one exemplary embodiment of the present inventive concept provides a deep learning system performing the method of managing data representation and the method of processing data.

According to an exemplary embodiment of the inventive concept, a method of processing data for a deep learning system is provided. The deep learning system is driven by a plurality of heterogeneous resources. The method includes, when a first task including at least one of a plurality of operations is to be performed, receiving first path information indicating a first computing path for the first task. The first computing path includes a sequence of operations included in the first task and a driving sequence of resources for performing the operations included in the first task. The method further includes setting data representation formats of the resources for performing the operations included in the first task based on data representation information and the first path information. The data representation information indicates an optimized data representation format for each of the plurality of heterogeneous resources.

The method may further include performing the first task based on the first path information and the data representation formats of the resources for performing the operations included in the first task.

According to an exemplary embodiment of the inventive concept, a deep learning system is provided. The deep learning system includes a plurality of heterogeneous resources, a first processor and a second processor. The deep learning system generates first path information indicating a first computing path for a first task when the first task includes at least one of a plurality of operations to be performed by at least one of the plurality of heterogeneous resources. The first computing path includes a sequence of operations included in the first task and a driving sequence of resources for performing the operations included in the first task. The second processor sets data representation formats of the resources for performing the operations included in the first task based on data representation information and the first path information. The data representation information indicates an optimized data representation format for each of the plurality of heterogeneous resources.

According to an exemplary embodiment of the inventive concept, a deep learning system is provided. The deep learning system includes a memory, and first to third processors. The memory stores a computer program including a neural network configured to classify data into one of a plurality of classes. The neural network includes a task having a plurality of sequential operations. The first processor is of a first type and is initially configured to output data in a first data format. The second processor is of a second other type and is initially configured to operate on data in a second data format different from the first data format. The third processor is configured to determine a first operation among the operations that is to be performed by the first processor having an output that is to be provided to a second operation among the operations that is to be performed by the second processor, and set the first processor to output data in the second data format when the first processor is about to perform the first operation.

In at least one embodiment of the inventive concept, the data representation format for each resource may be dynamically and efficiently set based on path information indicating a computing path including a driving sequence of the heterogeneous resources and the data representation information indicating an optimized or best-fitted data representation format for each resource. For example, the data output format of the former or front resource may be set based on the most optimized or best-fitted data representation format for the later or rear resource. In addition, the data representation format for each resource may be changed and updated in real-time or during runtime when the computing path is dynamically changed. Accordingly, data may be efficiently shared by the heterogeneous resources without a memory copy operation, communication cost may be reduced, and the deep learning system may have relatively improved or enhanced performance and energy efficiency.

BRIEF DESCRIPTION OF THE DRAWINGS

The inventive concept will become more apparent by describing exemplary embodiments thereof with reference to the accompanying drawings.

FIGS. 3A and 3B are diagrams for describing examples of a network structure that is driven by a deep learning system according to an exemplary embodiment of the inventive concept.

DETAILED DESCRIPTION OF THE EXEMPLARY EMBODIMENTS

Figure 1:
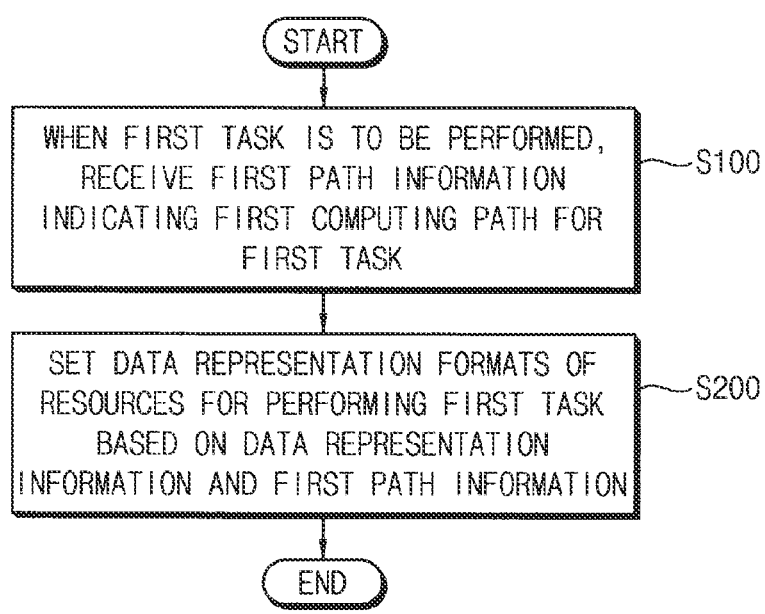
FIG. 1 is a flow chart illustrating a method of managing a data representation for deep learning according to an exemplary embodiment of the inventive concept.

The inventive concept will be described more fully with reference to the accompanying drawings, in which embodiments thereof are shown. The inventive concept may, however, be embodied in many different forms and should not be construed as limited to the embodiments set forth herein. Like reference numerals refer to like elements throughout this application.

FIG. 1 is a flow chart illustrating a method of managing a data representation for deep learning according to an exemplary embodiment of the inventive concept.

Referring to FIG. 1, a method of managing a data representation according to an exemplary embodiment is performed or executed by a deep learning system or service that is driven by a plurality of heterogeneous resources (e.g., at least two resources of different types). Hereinafter, the method of managing a data representation according to an exemplary embodiment will be described based on a deep learning system. However, the method of managing a data representation according to an exemplary embodiment may be applied to at least one of various machine learning systems such as an artificial neural network (ANN) system, a deep neural network (DNN) system, etc. Detailed configurations of the deep learning system will be described with reference to FIG. 2.

In the method of managing data representation for deep learning according to exemplary embodiments, first path information is received when a first task is to be performed (step S100). The first path information indicates a first computing path for the first task.

The first task includes at least one of a plurality of operations or arithmetic operations. For example, the first task may indicate an application or a service, e.g., an image classify service, a user authentication service based on bio-information or biometric data, an advanced driver assistance system (ADAS) service, a voice assistant service, or the like. For example, the plurality of operations may include various operations such as a convolution operation, a rectified linear unit (RELU) operation, etc.

The first computing path includes a sequence of operations included in the first task and a driving sequence of resources for performing the operations included in the first task. The operations included in the first task may be some of the plurality of operations, and the resources for performing the operations included in the first task may be some of the plurality of heterogeneous resources.

As used herein, the term "computing path" or "path" indicates a combination of resources, which are used for performing a single operation or task over a period of time. For example, at least one resource may be used for performing the single operation or task. Alternatively, to performing the single operation or task, a first resource may be used during a first time interval, and a second resource may be used during a second time interval after the first time interval. The term "computing path" or "path" may further include information used in each resource for performing the single operation or task, such as arithmetic algorithms, implementations, communication schemes, etc.

Data representation formats of the resources for performing the first task (e.g., the resources for performing the operations included in the first task) are set based on data representation information and the first path information (step S200).

The data representation information indicates an optimized or best-fitted data representation format for each of the plurality of heterogeneous resources. For example, a data representation format for each resource may include a data input format associated with data input to each resource and a data output format associated with data output from each resource. For example, as will be described with reference to FIG. 7, the data representation information may be stored as a table (e.g., a preference level table) for each resource.

In some exemplary embodiments, a data input format and a data output format of a single resource may be set to be different from each other, and thus it may be implemented such that two or more data representation formats are settable for each resource. For example, as will be described with reference to FIGS. 5, 6 and 7, a data input format of each resource may be set based on a data representation format which is optimized or best-fitted for itself, and a data output format of each resource may be set based on a data representation format which is optimized or best-fitted for a next resource receiving data output from each resource.

Figure 2:
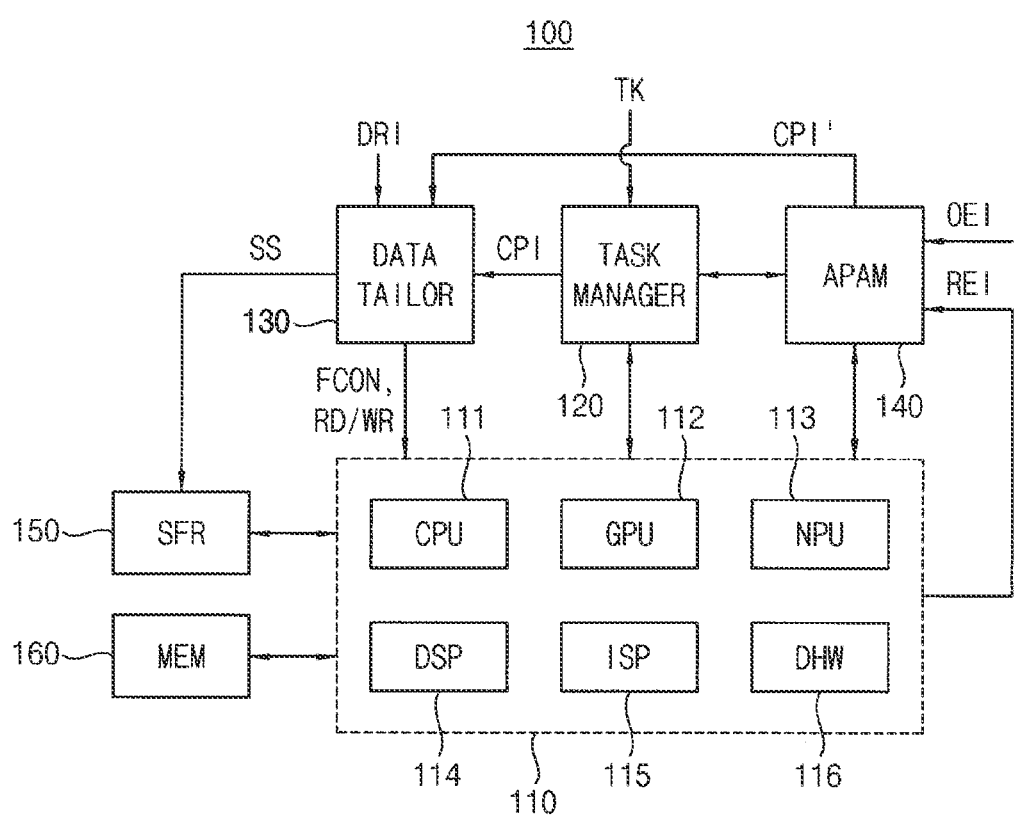
FIG. 2 is a block diagram illustrating a deep learning system according to an exemplary embodiment of the inventive concept.

FIG. 2 is a block diagram illustrating a deep learning system according to an exemplary embodiment of the inventive concept.

Referring to FIG. 2, a deep learning system 100 includes a plurality of heterogeneous resources 110, a task manager 120 and a data tailor 130. The deep learning system 100 may further include an adaptive path manager (APAM) 140, a special function register (SFR) 150 and a memory (MEM) 160.

The deep learning system 100 is driven by the plurality of heterogeneous resources 110. For example, various services (e.g., a task TK or an application) such as an image classify service, a user authentication service, an advanced driver-assisted system (ADAS) service, and/or a voice assistant service may be executed and processed by the plurality of heterogeneous resources 110.

The plurality of heterogeneous resources 110 may include a central processing unit (CPU) 111, a graphic processing unit (GPU) 112, a neural processing unit (NPU) 113, a digital signal processor (DSP) 114, an image signal processor (ISP) 115 and dedicated hardware (DHW) 116. In an embodiment, the NPU 113 is a microprocessor that specializes in the acceleration of machine learning algorithms. For example, the dedicated hardware 116 may include a vision processing unit (VPU), vision intellectual property (VIP), etc. A VPU may be implemented by a microprocessor designed to accelerate machine vision tasks. Each resource may be referred to as a processing element (PE).

Although FIG. 2 illustrates only computing resources as examples of the plurality of heterogeneous resources 110, the plurality of heterogeneous resources 110 may further include communication resources such as a direct memory access unit (DMA) for controlling access to the memory 160, or a connectivity unit for supporting various internal and/or external communications. For example, the connectivity unit could be implemented by a transceiver or a modem.

In an embodiment, the task manager 120 receives a task TK from an external device or a user, manages or schedules execution of the received task TK, and assigns the task TK to one or more of the plurality of heterogeneous resources 110. In an embodiment, the external device includes a memory and a processor. The memory stores a computer program including a neural network configured to classify data into one of a plurality of classes. The neural network includes a task having a plurality of sequential operations. In an embodiment, the processor is configured to determine a first operation among the operations that is to be performed by a first one of the resources 110 having an output that is to be provided to a second operation among the operations that is to be performed by a second one of the resources 110, and set the first resource to output data in a data format the second resource is configured to operate on when the first resource is about to perform the first operation. For example, the task manager 120 assigns operations included in the task TK to one or more of the plurality of heterogeneous resources 110, and generates path information CPI that indicates a computing path for the task TK. The computing path for the task TK may include a sequence of the operations included in the task TK and a driving sequence of resources for performing the operations included in the task TK. For example, the computing path could indicate that a first operation of the task TK is to be performed by the CPU 111, a second operation of the task TK is to be performed by the GPU 112 after the first operation, a third operation of the task TSK is to be performed by the NPU 113 after the second operation, etc. The step S100 in FIG. 1 may be performed by the task manager 120.

The data tailor 130 receives the path information CPI from the task manager 120, and receives data representation information DRI that indicates an optimized or a best-fitted data representation format for each of the plurality of heterogeneous resources 110. For example, the data representation information DRI may be pre-stored in the memory 160, and the data tailor 130 may receive the data representation information DRI from the memory 160. The data tailor 130 sets data representation formats of the resources for performing the operations included in the task TK based on the data representation information DRI and the path information CPI. In other words, step S200 in FIG. 1 may be performed by the data tailor 130.

In an exemplary embodiment, the data tailor 130 generates a register setting signal SS as a result of setting the data representation formats. The register setting signal SS may be provided to the special function register 150, and the data representation formats of the resources for performing the operations included in the task TK may be set and stored in the special function register 150. The setting signal SS may indicate the data representation formats that were set by the data tailor 130. The plurality of heterogeneous resources 110 may communicate with the special function register 150 and may perform the task TK using the set and stored data representation formats. For example, one of the resources 110 may perform an operation of the task TK to generate data in one of the data representation formats. In an exemplary embodiment, the data tailor 130 is implemented by a processor or a microprocessor.

In an exemplary embodiment, the data tailor 130 provides a dedicated interface FCON as a result of setting the data representation formats. For example, the dedicated interface FCON may be provided to the plurality of heterogeneous resources 110 as a conversion function including a data input format and a data output format. For example, the conversion function may be defined as "Convert(pIn, pOut, IN_format, OUT_format)," and parameters "pIn," "pOut," "IN_format" and "OUT_format" in the conversion function may indicate input data, output data, the data input format and the data output format, respectively. The plurality of heterogeneous resources 110 may perform the task TK using the set data representation formats based on the dedicated interface FCON.

In an exemplary embodiment of the inventive concept, the data tailor 130 provides instructions RD and WR as a result of setting the data representation formats. For example, the instructions RD and WR may be provided to the plurality of heterogeneous resources 110 as a data read instruction RD indicating a data input format and a data write instruction WR indicating a data output format. For example, the data read instruction RD and the data write instruction WR may be defined as "Read(pIn, IN_format)" and "Write(pOut, OUT_format)," respectively. The plurality of heterogeneous resources 110 may perform the task TK using the set data representation formats based on the instructions RD and WR.

In an embodiment, the adaptive path manager 140 receives resource environment information REI indicating a resource environment associated with the plurality of heterogeneous resources 110, and receives operating environment information OEI indicating an operating environment associated with at least one electronic device including the plurality of heterogeneous resources 110. In an embodiment, the adaptive path manager 140 is implemented by a processor or a microprocessor. For example, the resource environment may indicate whether the plurality of heterogeneous resources 110 are available or not, and the operating environment may indicate contexts (e.g., current states or conditions) of the at least one electronic device including the plurality of heterogeneous resources 110. For example, one of the resources 110 may send environment information OEI to the adaptive path manager 140 indicating whether the one resource is available or not. Although not illustrated in FIG. 2, the deep learning system 10 may further include a resource manager that generates the resource environment information REI.

The adaptive path manager 140 may change the computing path and the path information CPI based on the resource environment information REI and the operating environment information OEI to generate updated computing path and updated path information CPI'. In other words, the computing path may be dynamically and adaptively set and changed (e.g., updated) based on resources and contexts (e.g., resource-aware and context-aware).

When the computing path and the path information CPI is changed, the data tailor 130 receives the updated path information CPI'. The data tailor 130 may change the data representation formats of the resources for performing the operations included in the task TK based on the data representation information DRI and the updated or changed path information CPI'. Operations of the adaptive path manager 140 and the data tailor 130 will be described with reference to FIG. 10. Since the data representation formats are changed by the data tailor 130, the data tailor 130 may be referred to as a data reshaper.

The memory 160 may store various data that are processed by the deep learning system 100. In some exemplary embodiments, the memory 160 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc.

In an exemplary embodiment, all elements in the deep learning system 100 are included in a single electronic device.

In an exemplary embodiment, at least a part of the task manager 120, the data tailor 130 and the adaptive path manager 140 in FIG. 2 are implemented by hardware. For example, at least a part of the elements included in the deep learning system 100 according to an exemplary embodiment are included in a computer-based electronic system. In another exemplary embodiment, at least a part of the task manager 120, the data tailor 130 and the adaptive path manager 140 in FIG. 2 are implemented as instruction codes or program routines (e.g., a software program). For example, the instruction codes or the program routines may be executed by a computer-based electronic system, and may be stored in any storage device located inside or outside the computer-based electronic system.

Although FIG. 2 illustrates only data/signal transmission flows between some elements in the deep learning system 100, all elements in the deep learning system 100 may be connected to one another via at least one bus, and thus all elements in the deep learning system 100 may be communicate with one another via the at least one bus.

Although not illustrated in FIG. 2, the deep learning system 100 may further include software elements (e.g., a framework, a kernel or a device driver, a middleware, an application programming interface (API), an application program or an application, or the like). At least a part of the software elements may be referred to as an operating system (OS).

Figure 3A:
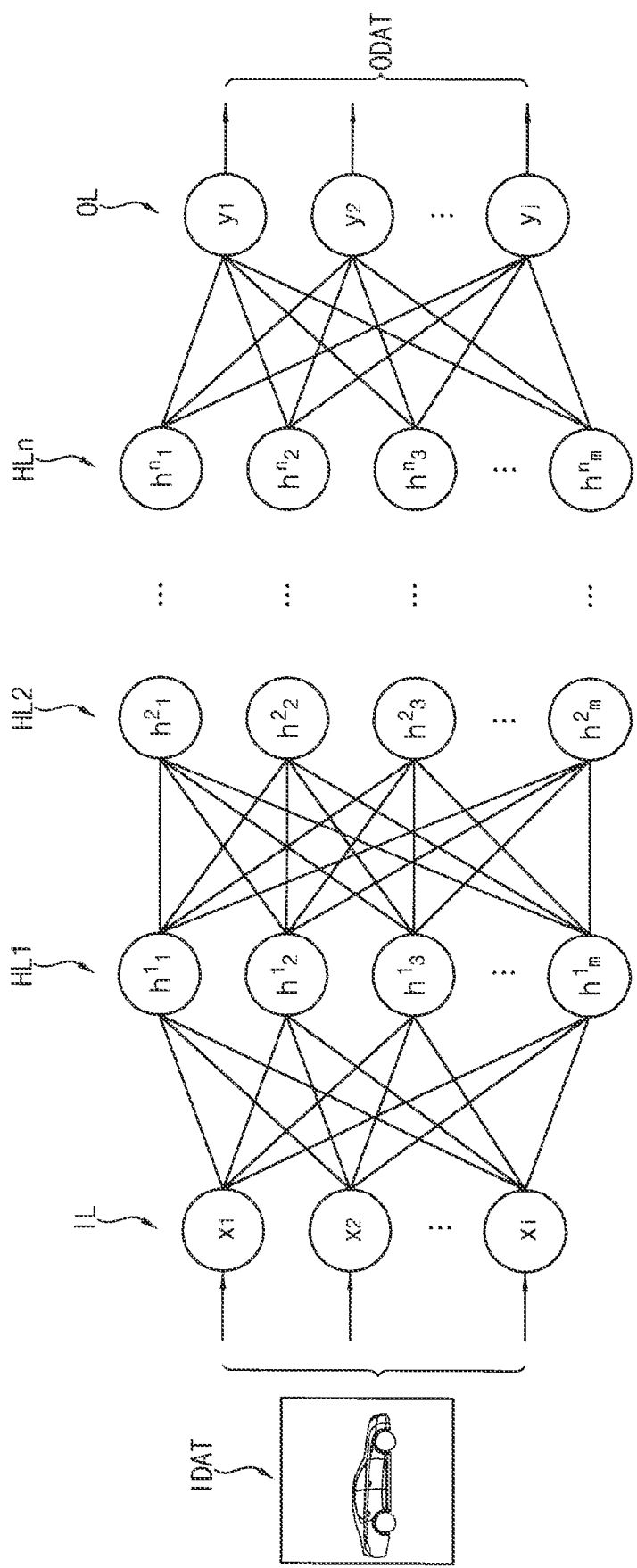

FIGS. 3A and 3B are diagrams for describing examples of a network structure that is driven by a deep learning system according to an exemplary embodiment of the inventive concept.

Referring to FIG. 3A, a general neural network includes an input layer IL, a plurality of hidden layers HL1, HL2, . . . , HLn and an output layer OL.

The input layer IL may include i input nodes $x_1$, $x_2$, . . . , $x_i$, where i is a natural number. Input data (e.g., vector input data) IDAT whose length is i may be input to the input nodes $x_1$, $x_2$, . . . , $x_i$ such that each element of the input data IDAT is input to a respective one of the input nodes $x_1$, $x_2$, . . . , $x_i$.

The plurality of hidden layers HL1, HL2, . . . , HLn include n hidden layers, where n is a natural number, and include a plurality of hidden nodes $h^1_1$, $h^1_2$, $h^1_3$, . . . , $h^1_m$, $h^2_1$, $h^2_2$, $h^2_3$, . . . , $h^2_m$, $h^n_1$, $h^n_2$, $h^n_3$, . . . , $h^n_m$. For example, the hidden layer HL1 includes m hidden nodes $h^1_1$, $h^1_2$, $h^1_3$, . . . , $h^1_m$, the hidden layer HL2 includes m hidden nodes $h^2_1$, $h^2_2$, $h^2_3$, . . . , $h^2_m$, and the hidden layer HLn includes m hidden nodes $h^n_1$, $h^n_2$, $h^n_3$, . . . , $h^n_m$, where m is a natural number.

The output layer OL includes j output nodes $y_1$, $y_2$, . . . , $y_j$, where j is a natural number. Each of the output nodes $y_1$, $y_2$, . . . , $y_j$ corresponds to a respective one of a plurality of classes to be categorized. The output layer OL may output output values (e.g., class scores or simply scores) associated with the input data IDAT for each of the classes. The output layer OL may be referred to as a fully-connected layer. For example, the output layer OL could indicate a probability that the input data IDAT corresponds to a car when the neural network is configured to determine whether an input image corresponds to a car.

A structure of the neural network illustrated in FIG. 3A may be represented by information on branches (or connections) between nodes illustrated as lines, and a weighted value assigned to each branch, which is not illustrated. Nodes within one layer are not connected to one another, but nodes of different layers may be fully or partially connected to one another.

Each node (e.g., the node $h^1_1$) receives an output of a previous node (e.g., the node $x_1$), may perform a computing operation, computation or calculation on the received output, and outputs a result of the computing operation, computation or calculation as an output to a next node (e.g., the node $h^2_1$). Each node may calculate a value to be output by applying the input to a specific function (e.g., a nonlinear function).

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 3A may not be suitable for handling input image data (or input sound data) because each node (e.g., the node $h^1{}_1$) is connected to all nodes of a previous layer (e.g., the nodes $x_1, x_2, \ldots, x_i$ included in the layer IL) and then the number of weighted values drastically increases as the size of the input image data increases. A convolutional neural network is implemented by combining a filtering technique with the general neural network. A two-dimensional image (e.g., the input image data) can be efficiently trained by the convolutional neural network.

Referring to FIG. 3B, a convolutional neural network includes a plurality of layers CONV1, RELU1, CONV2, RELU2, POOL1, CONV3, RELU3, CONV4, RELU4, POOL2, CONV5, RELU5, CONV6, RELU6, POOLS and FC.

Unlike the general neural network, each layer of the convolutional neural network has three dimensions of width, height and depth, and thus data that is input to each layer may be volume data having three dimensions of width, height and depth. For example, if an input image in FIG. 3B has a size of a 32 width (e.g., 32 pixels) and a 32 height and three color channels R, G and B, input data IDAT corresponding to the input image may have a size of 32*32*3. The input data IDAT in FIG. 3B may be referred to as input volume data or input activation volume.

Each of the convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window or kernel.

Particularly, parameters of each convolutional layer may consist of a set of learnable filters. Every filter may be small spatially (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of the volume data increases).

Each of the RELU layers RELU1, RELU2, RELU3, RELU4, RELU5 and RELU6 may perform a rectified linear unit operation that corresponds to an activation function defined by, e.g., a function $f(x)=\max(0, x)$ (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of the volume data is maintained).

Each of the pooling layers POOL1, POOL2 and POOLS may perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing a spatial size of an image and extracting a characteristic of the image.

An output layer or a fully-connected layer FC may output results (e.g., class scores) of the input volume data IDAT for each of the classes. For example, the input volume data IDAT corresponding to the two-dimensional image may be converted into a one-dimensional matrix or vector as the convolutional operation and the down-sampling operation are repeated. For example, the fully-connected layer FC may represent probabilities that the input volume data IDAT corresponds to a car, a truck, an airplane, a ship and a horse.

The types and number of layers included in the convolutional neural network is not limited to the example described with reference to FIG. 3B and may be changed according to exemplary embodiments. In addition, although not illustrated in FIG. 3B, the convolutional neural network may further include other layers such as a softmax layer for converting score values corresponding to predicted results into probability values, or a bias adding layer for adding at least one bias.

Figure 4A:
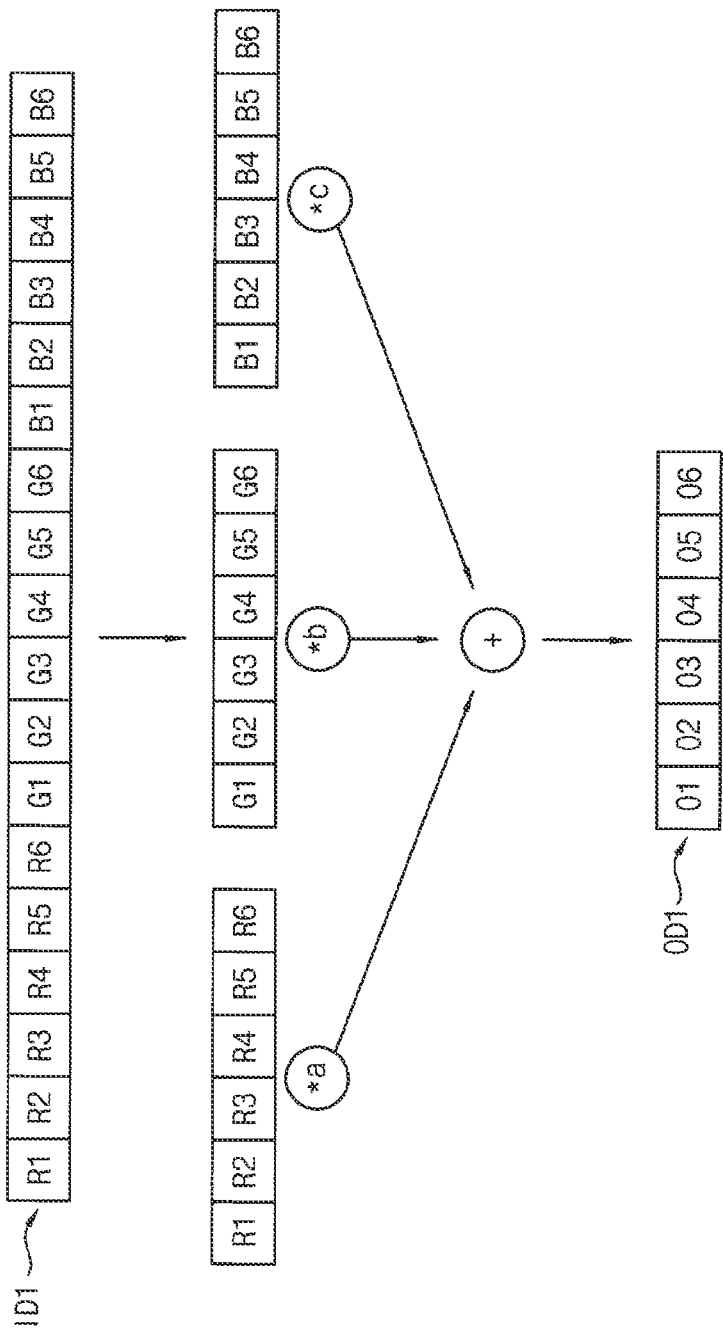
FIGS. 4A and 4B are diagrams for describing examples of a data processing scheme and a data representation format in a deep learning system according to an exemplary embodiment of the inventive concept.
Figure 4B:
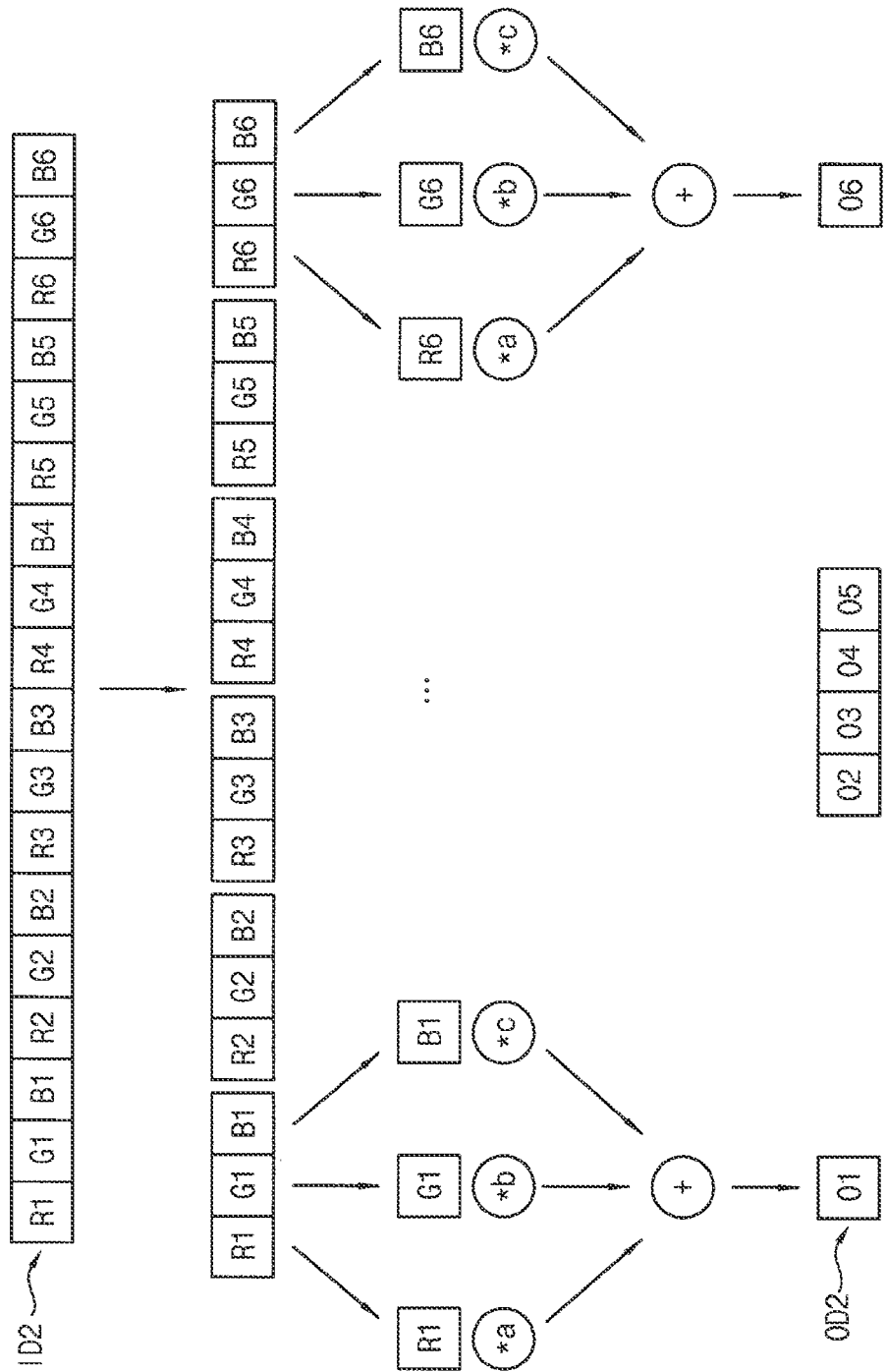

FIGS. 4A and 4B are diagrams for describing examples of a data processing scheme and a data representation format in a deep learning system according to an exemplary embodiment of the inventive concept. An operation illustrated in each of FIGS. 4A and 4B may correspond to an operation that is performed on one layer in FIG. 3A and/or FIG. 3B.

Referring to FIG. 4A, input data ID1 including red subpixel data R1, R2, R3, R4, R5 and R6, green subpixel data G1, G2, G3, G4, G5 and G6, and blue subpixel data B1, B2, B3, B4, B5 and B6 that are arranged according to color may be received. The input data ID1 may be separated in color, and output data OD1 including data O1, O2, O3, O4, O5 and O6 may be generated by multiplying each subpixel data by a weighted value and by adding the weighted subpixel data. For example, a first weighted value "a" may be multiplied by the red subpixel data R1, R2, R3, R4, R5 and R6 at a time, a second weighted value "b" may be multiplied by the green subpixel data G1, G2, G3, G4, G5 and G6 at a time, a third weighted value "c" may be multiplied by the blue subpixel data B1, B2, B3, B4, B5 and B6 at a time, and the weighted red subpixel data, the weighted green subpixel data and the weighted blue subpixel data may be added together at a time to generate the data O1, O2, O3, O4, O5 and O6 (e.g., $O1=a*R1+b*G1+c*B1$). A data processing scheme illustrated in FIG. 4A may be referred to as a number, channel, height and width (NCHW) scheme.

Referring to FIG. 4B, input data ID2 including red subpixel data R1, R2, R3, R4, R5 and R6, green subpixel data G1, G2, G3, G4, G5 and G6, and blue subpixel data B1, B2, B3, B4, B5 and B6 are arranged in units of a pixel. The input data ID1 may be separated in a pixel including one red subpixel, one green subpixel and one blue subpixel. Output data OD2 including data O1, O2, O3, O4, O5 and O6 may be generated by multiplying each subpixel data by a weighted value and by adding the weighted subpixel data. For example, a first weighted value "a" may be multiplied by the red subpixel data R1, a second weighted value "b" may be multiplied by the green subpixel data G1, a third weighted value "c" may be multiplied by the blue subpixel data B1, and the output data O1 may be generated by adding the weighted red subpixel data, the weighted green subpixel data and the weighted blue subpixel data (e.g., O1=a*R1+b*G1+c*B1). The other output data O2, O3, O4, O5 and O6 may be generated in a similar way. A data processing scheme illustrated in FIG. 4B may be referred to as a number, height, width and channel (NHWC) scheme.

Although the output data OD1 in FIG. 4A and the output data OD2 in FIG. 4B have the same value, data representation format of the input data ID1 in FIG. 4A and data representation format of the input data ID2 in FIG. 4B may be different from each other because the data processing scheme in FIG. 4A and the data processing scheme in FIG. 4B are different from each other. If the input data ID2 in FIG. 4B is provided to an example of FIG. 4A as an input, or if the input data ID1 in FIG. 4A is provided to an example of FIG. 4B as an input, additional operations and/or processes may be required, performance may be degraded, and power consumption may increase. Thus, it is important to provide input data having an optimized or a best-fitted data representation format.

The data processing scheme and the data representation format in the deep learning system are not limited to examples of FIGS. 4A and 4B and may be changed according to exemplary embodiments. For example, data representation formats of input/output data of resources may include at least one of a combination of various data properties, e.g., various data types (e.g., floating point or integer), various layouts (e.g., NCHW or NHWC) for hardwares, operations, algorithms and libraries, various quantization schemes, various data compression schemes (e.g., Lempel Ziv (LZ) or Huffman), etc. In addition, an optimized or best-fitted data representation format may be different for each resource.

Figure 5:
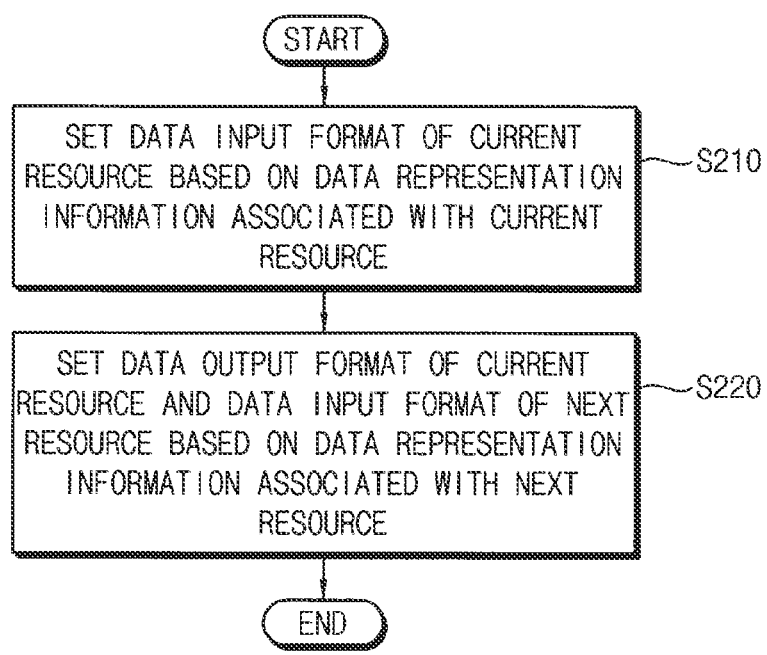
FIG. 5 is a flow chart illustrating an example of setting a data representation format in FIG. 1.
Figure 6:
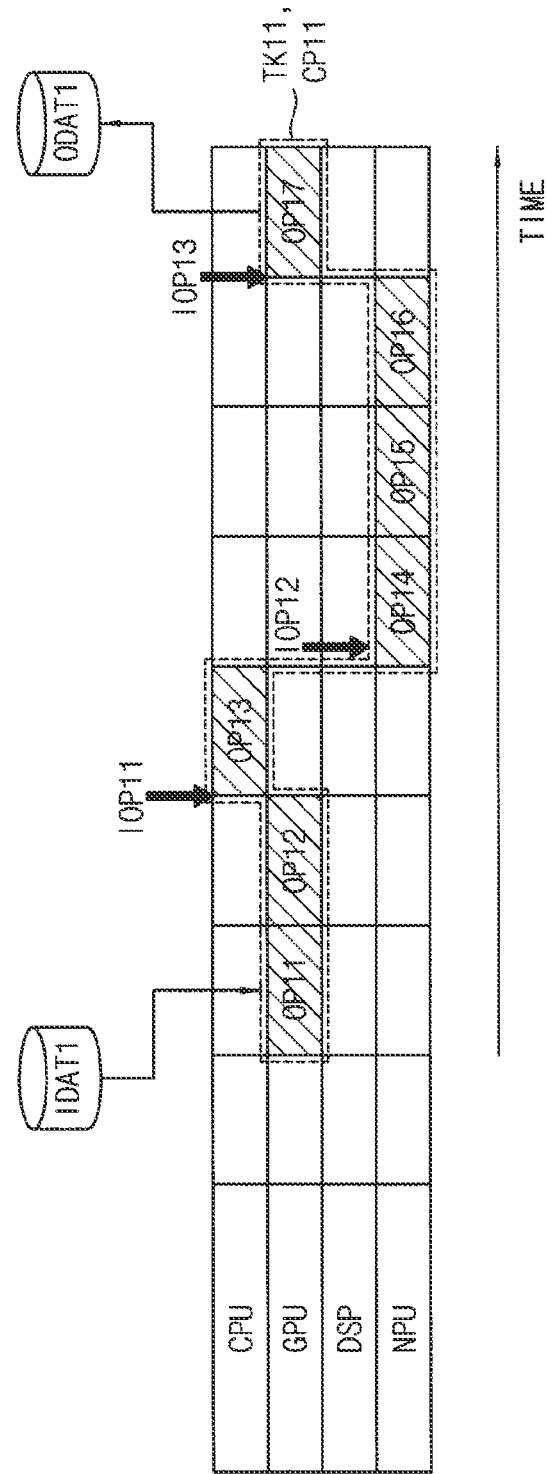
FIGS. 6, 7 and 8 are diagrams for describing an operation of setting a data representation format of FIG. 5.
Figure 7:
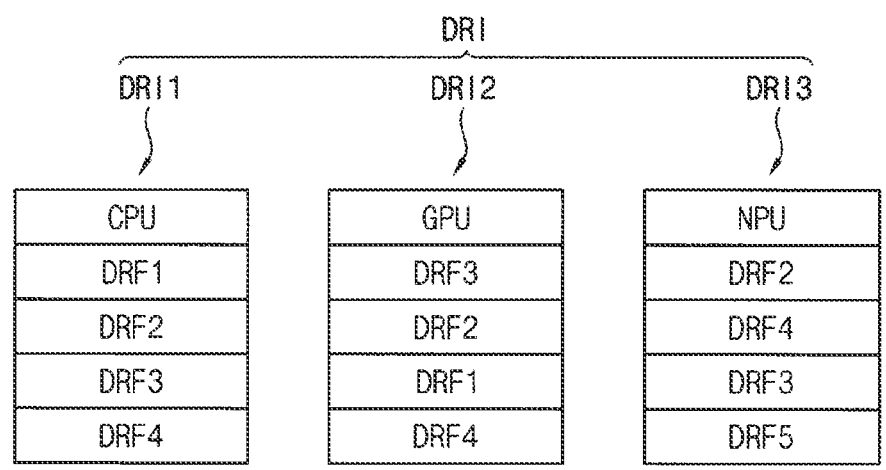
Figure 8:
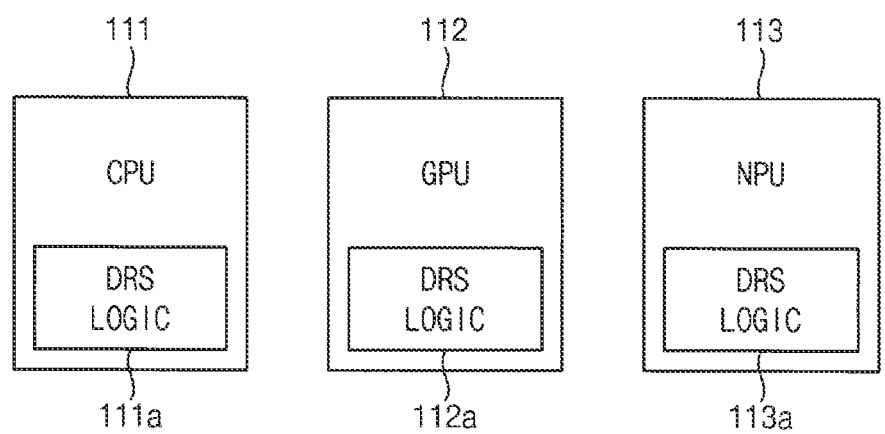

FIG. 5 is a flow chart illustrating an example of setting a data representation format in FIG. 1. FIGS. 6, 7 and 8 are diagrams for describing an operation of setting the data representation format of FIG. 5.

Referring to FIGS. 1, 5, 6, 7 and 8, when setting the data representation formats of the resources (step S200), a data input format of a current resource is set based on data representation information associated with the current resource (step S210), and a data output format of the current resource and a data input format of a next resource is set based on data representation information associated with the next resource (step S220).

As illustrated in FIG. 6, a first task TK11 includes several operations OP11, OP12, OP13, OP14, OP15, OP16 and OP17 that are sequentially performed, and may be performed by different types of resources CPU, GPU and NPU. For example, the first task TK11 is performed by receiving data IDAT1, by performing the operations OP11 and OP12 by the GPU, by performing the operation OP13 by the CPU, by performing the operations OP14, OP15 and OP16 by the NPU, by performing the operation OP17 by the GPU, and by outputting data ODAT1. For example, the GPU may perform the operation OP11 on the input data IDAT1 to a generate a first result, the GPU may perform the operation OP12 on the first result to generate a second result, the CPU may perform the operation OP13 on the second result to generate a third result, the NPU may perform the operation OP14 on the third result to generate a fourth result, the NPU may perform the operation OP15 on the fourth result to generate a fifth result, the NPU may perform the operation OP16 on the fifth result to generate a sixth result, and the GPU may perform the operation OP17 on the sixth result to generate the output data ODAT1. The input data IDAT1 may correspond to the input data ID1 shown in FIG. 4A or the input data ID2 shown in FIG. 4B. The output data ODAT1 may correspond to the output data OD1 shown in FIG. 4A or the output data OD2 shown in FIG. 4B. A sequence of the operations OP11, OP12, OP13, OP14, OP15, OP16 and OP17 included in the first task TK11 over a period of time and a driving sequence of the resources CPU, GPU and NPU for performing the operations OP11, OP12, OP13, OP14, OP15, OP16 and OP17 may be defined as a first computing path CP11. The first computing path CP11 may be predetermined, and may be received at step S100 in FIG. 1.

In addition, as illustrated in FIG. 7, the data representation information DRI may be provided and stored as a preference level table for each of the plurality of heterogeneous resources. For example, the data representation information DRI may include data representation information DRI1 for the CPU, data representation information DRI2 for the GPU and data representation information DRI3 for the NPU.

In an exemplary embodiment, two or more data representation formats are settable for each of the plurality of heterogeneous resources. For example, four data representation formats DRF1, DRF2, DRF3 and DRF4 may be settable for the CPU, and the data representation format DRF1 may be the most optimized or best-fitted data representation format for the CPU. Similarly, four data representation formats DRF3, DRF2, DRF1 and DRF4 may be settable for the GPU, and the data representation format DRF3 may be the most optimized or best-fitted data representation format for the GPU. Four data representation formats DRF2, DRF4, DRF3 and DRF5 may be settable for the NPU, and the data representation format DRF2 may be the most optimized or best-fitted data representation format for the NPU.

In some exemplary embodiments, there may be a kernel and/or a library for each operation based on the number of representation formats in the data representation information DRI. The deep learning system may operate based on a caching-ahead scheme in which data for changing resources and setting the data representation formats is cached in advance, and/or the deep learning system may operate using the DMA.

When setting the data representation formats of the resources CPU, GPU and NPU for performing the first task TK11, since the operations OP11 and OP12 are to be performed by the GPU first based on the first computing path CP11, the data input format of the GPU is set to the data representation format DRF3, which is the most optimized or best-fitted data representation format for the GPU, based on the data representation information DRI2 for the GPU. The data IDAT1 according to the data representation format DRF3 is provided to the GPU, and the operations OP11 and OP12 are performed by the GPU. Since the operations OP11 and OP12 are sequentially or continuously performed by the same resource (e.g., by the GPU), it is not necessary to set the data representation formats between the operation OP11 and the operation OP12 to be different.

Since the operation OP13 is to be performed by the CPU after the operation OP12 based on the first computing path CP11, data output format of the GPU and data input format of the CPU are set to the data representation format DRF1, which is the most optimized or best-fitted data representation format for the CPU, based on the data representation information DRI1 for the CPU. In other words, in two adjacent resources (e.g., in two successive resources), the data output format of the former or front resource (e.g., the GPU) and data input format of the later or rear resource (e.g., the CPU) are set to be the same as each other, and thus the data input format (e.g., the data representation format DRF3) and the data output format (e.g., the data representation format DRF1) of the GPU are different from each other. Data output from the GPU according to the data representation format DRF1 is provided to the CPU, and the operation OP13 is performed by the CPU. For example, the GPU executes the operation OP11 on input data IDAT1 having format DRF3 to generate a first result having format DRF3, the GPU executes the operation OP12 on the first result to generate a second result having format DRF1, and the CPU executes the operation OP13 on the second result.

In an exemplary embodiment, an operation IOP11 for changing the data output format of the GPU is automatically inserted between the operation OP12 and the operation OP13 so that the data output format of the GPU and the data input format of the CPU are matched with each other. For example, the task TK11 can be converted into a modified task that includes the operation IOP11 between the operation OP12 and OP13.

In an exemplary embodiment, an output operand of the GPU is changed so that the data output format of the GPU and the data input format of the CPU are matched with each other.

In exemplary embodiments, the special function register 150 may be set, the dedicated interface FCON may be provided, or the instructions RD and WR may be provided, as described with reference to FIG. 2, so that the data output format of the GPU and the data input format of the CPU are matched with each other.

According to an exemplary embodiment, the data output format of the GPU and the data input format of the CPU are matched with each other based on a combination of two or more schemes described above.

Since the operations OP14, OP15 and OP16 are to be performed by the NPU after the operation OP13 based on the first computing path CP11, a data output format of the CPU and a data input format of the NPU are set to the data representation format DRF2, which is the most optimized or best-fitted data representation format for the NPU, based on the data representation information DRI3 for the NPU. In other words, the data output format of the CPU and the data input format of the NPU are set to be the same as each other, and thus the data input format (e.g., the data representation format DRF1) and the data output format (e.g., the data representation format DRF2) of the CPU are different from each other. Data output from the CPU and according to the data representation format DRF2 is provided to the NPU, and the operations OP14, OP15 and OP16 are performed by the NPU. Since the operations OP14, OP15 and OP16 are sequentially or continuously performed by the same resource (e.g., by the NPU), it is not necessary to set the data representation formats between the operation OP14 and the operation OP15 and the data representation formats between the operation OP15 and the operation OP16 to be different.

According to exemplary embodiments, an operation IOP12 for changing the data output format of the CPU may be automatically inserted between the operation OP13 and the operation OP14, an output operand of the CPU may be changed, the special function register 150 may be set, the dedicated interface FCON may be provided, the instructions RD and WR may be provided, or two or more schemes described above may be combined such that the data output format of the CPU and the data input format of the NPU are matched with each other.

Since the operation OP17 is to be performed by the GPU after the operation OP16 based on the first computing path CP11, a data output format of the NPU and the data input format of the GPU are set to the data representation format DRF3, which is the most optimized or best-fitted data representation format for the GPU, based on the data representation information DRI2 for the GPU. In other words, the data output format of the NPU and the data input format of the GPU are set to be the same as each other, and thus the data input format (e.g., the data representation format DRF2) and the data output format (e.g., the data representation format DRF3) of the NPU are different from each other. Data output from the NPU according to the data representation format DRF3 is provided to the GPU, the operation OP17 is performed by the GPU, and the data ODAT1 is output finally.

According to exemplary embodiments, an operation IOP13 for changing the data output format of the NPU may be automatically inserted between the operation OP16 and the operation OP17, an output operand of the NPU may be changed, the special function register 150 may be set, the dedicated interface FCON may be provided, the instructions RD and WR may be provided, or two or more schemes described above may be combined so that the data output format of the NPU and the data input format of the GPU are matched with each other.

In an exemplary embodiment, as illustrated in FIG. 8, the resources CPU, GPU and NPU include logic units 111a, 112a and 113a, respectively. Each of the logic units 111a, 112a and 113a may be used for setting the data representation format of a respective one of the resources CPU, GPU and NPU (e.g., for changing the data output format of a respective one of the resources CPU, GPU and NPU). An example illustrated in FIG. 6 may be implemented based on an example in which the logic unit 111a supports the most optimized or best-fitted data representation format for the CPU and NPU (e.g., the data representation formats DRF1 and DRF2), the logic unit 112a supports the most optimized or best-fitted data representation format for the GPU and CPU (e.g., the data representation formats DRF3 and DRF1), and the logic unit 113a supports the most optimized or best-fitted data representation format for the NPU and GPU (e.g., the data representation formats DRF2 and DRF3).

In some exemplary embodiments, when the former or front resource does not support the most optimized or best-fitted data representation format for the later or rear resource, the data output format of the former or front resource is set to the second most optimized or second best-fitted data representation format for the later or rear resource. For example, although not illustrated in FIG. 6, when the resource is changed from the NPU to the CPU, the NPU may not support the data representation format DRF1, which is the most optimized or best-fitted data representation format for the CPU, and thus the data output format of the NPU is set to the data representation format DRF2, which is the second most optimized or second best-fitted data representation format for the CPU. In this example, the data input format and the data output format of the NPU are set to be the same as each other.

In the method of managing data representation according to exemplary embodiments, the data representation format for each resource may be dynamically and efficiently set based on the path information indicating the computing path including the driving sequence of the heterogeneous resources and the data representation information indicating an optimized or best-fitted data representation format for each resource. For example, the data output format of the former or front resource may be set based on the most optimized or best-fitted data representation format for the later or rear resource. Accordingly, data may be efficiently shared by the heterogeneous resources without a memory copy operation, thereby reducing communication cost.

Figure 9:
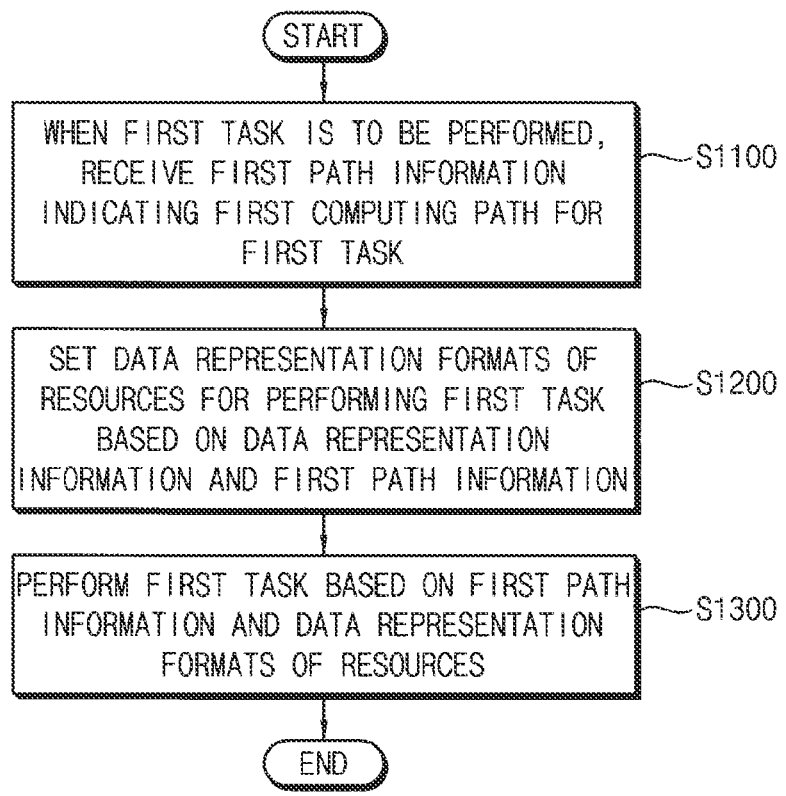
FIG. 9 is a flow chart illustrating a method of processing data for deep learning according to an exemplary embodiment of the inventive concept.

FIG. 9 is a flow chart illustrating a method of processing data for deep learning according to an exemplary embodiment of the inventive concept.

Referring to FIG. 9, a method of processing data according to an exemplary embodiment of the inventive concept is performed or executed by a deep learning system or service that is driven by a plurality of heterogeneous resources.

In the method of processing data for deep learning according to exemplary embodiments, steps S1100 and S1200 in FIG. 9 may be substantially the same as steps S100 and S200 in FIG. 1, respectively.

The first task is performed based on the first path information and the data representation formats of the resources for performing the operations included in the first task (step S1300). For example, as described with reference to FIG. 6, the operations OP11, OP12, OP13, OP14, OP15, OP16 and OP17 may be performed by the resources CPU, GPU and NPU based on the data output formats of the resources CPU, GPU and NPU that are set based on the most optimized or best-fitted data representation format for the later or rear resource, and thus the first task TK11 may be efficiently performed. For example, step S1300 in FIG. 9 may be performed by the plurality of heterogeneous resources 110 in FIG. 2.

In the method of processing data according to at least one exemplary embodiment, the data representation format for each resource is dynamically and efficiently set based on the path information and the data representation information, and the data may be efficiently shared by the heterogeneous resources without a memory copy operation. Accordingly, the deep learning system may have relatively improved or enhanced performance and energy efficiency.

Figure 10:
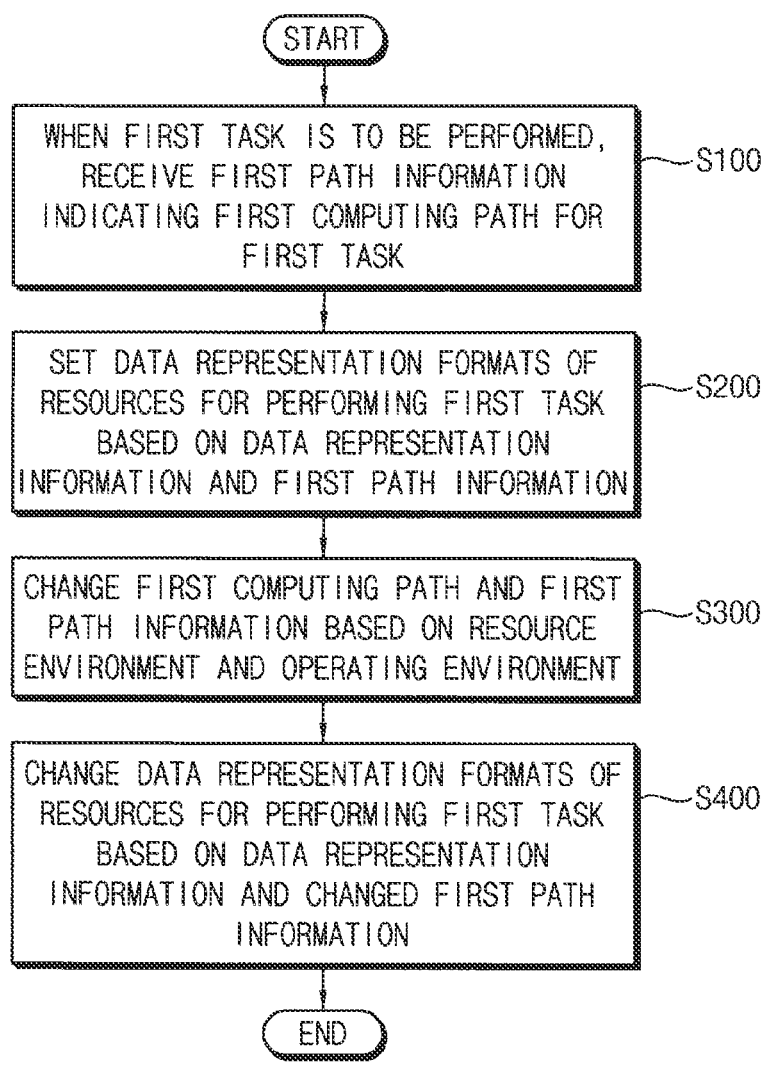
FIG. 10 is a flow chart illustrating a method of managing a data representation for deep learning according to an exemplary embodiment of the inventive concept.

FIG. 10 is a flow chart illustrating a method of managing a data representation for deep learning according to an exemplary embodiment of the inventive concept.

Referring to FIG. 10, in a method of managing a data representation for deep learning according to an exemplary embodiment, steps S100 and S200 in FIG. 10 may be substantially the same as steps S100 and S200 in FIG. 1, respectively.

The first computing path and the first path information are changed based on the resource environment and the operating environment (step S300). For example, step S300 in FIG. 10 may be performed by the adaptive path manager 140 in FIG. 2.

In an embodiment, the resource environment indicates whether the plurality of heterogeneous resources 110 are available or not. The operating environment may indicate contexts (e.g., current states or conditions) of at least one electronic device including the plurality of heterogeneous resources 110. For example, the operating environment may include a normal mode, a low power mode, a secure mode, a private mode, etc.

The data representation formats of the resources for performing the first task (e.g., the resources for performing the operations included in the first task) are changed based on the data representation information and the changed first path information (step S400). For example, step S400 may be similar to step S200, and may be performed by the data tailor 130 in FIG. 2.

Figure 11:
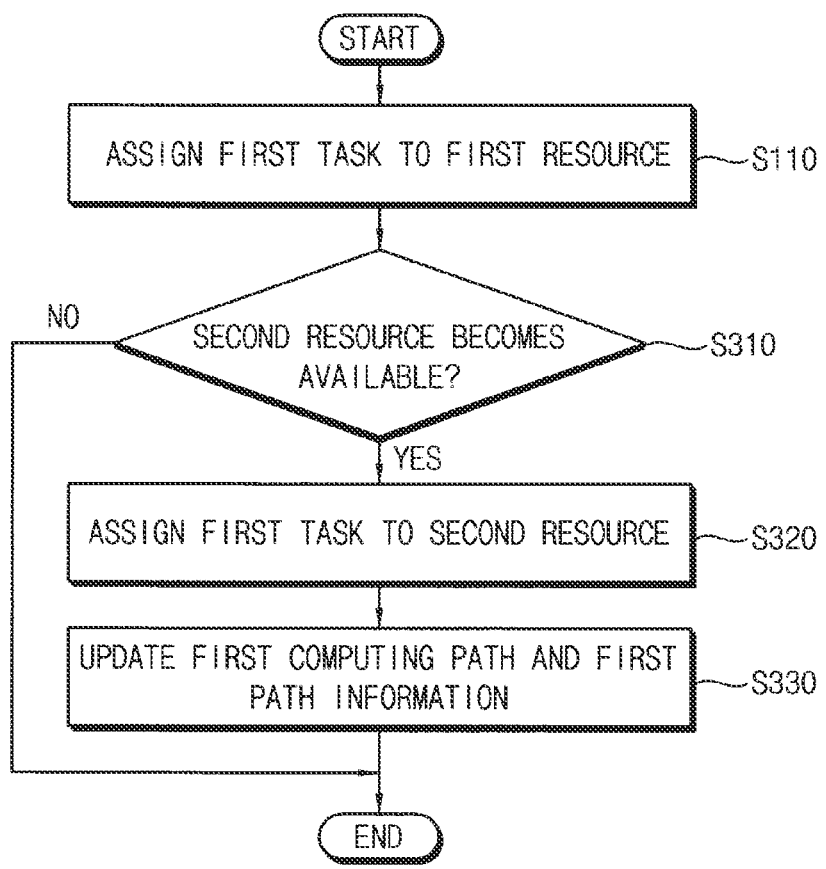
FIG. 11 is a flow chart illustrating an example of changing a computing path and path information in FIG. 10.
Figure 12:
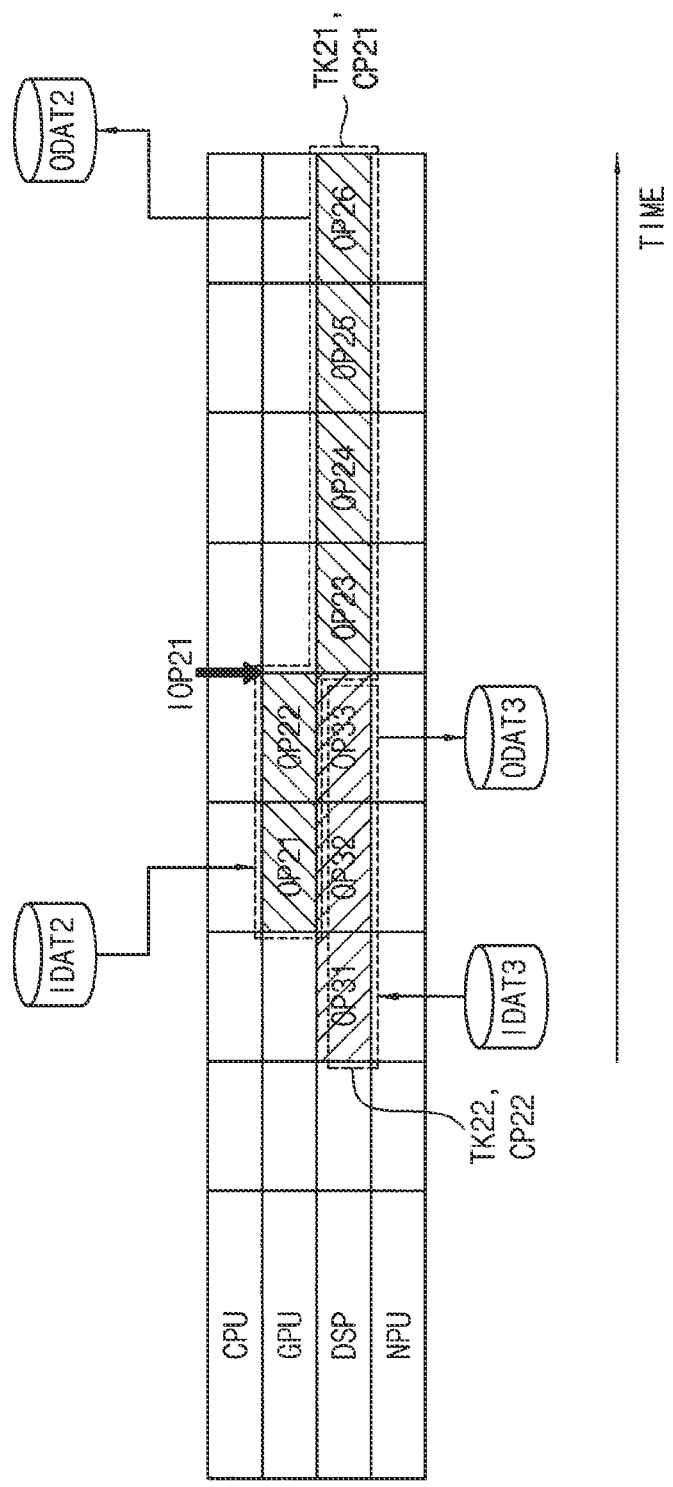
FIG. 12 is a diagram for describing an operation of changing a computing path and path information of FIG. 11.

FIG. 11 is a flow chart illustrating an example of changing a computing path and path information in FIG. 10. FIG. 12 is a diagram for describing an operation of changing a computing path and path information of FIG. 11.

Referring to FIGS. 10, 11 and 12, before changing the first computing path and the first path information (step S300), the first task is assigned to a first resource (step S110). Information in which the first task is assigned to the first resource may be included in the first path information received at step S100.

When changing the first computing path and the first path information (step S300), it may be checked whether a second resource which has a priority higher than that of the first resource becomes available (step S310). For example, if the first task prefers that its operation be performed by the GPU, and the GPU is currently unavailable, the first task could initially be assigned to the CPU, and then the first task could be assigned to the GPU if the GPU becomes available before the first task is completed. When the second resource becomes available before the first task is completed (step S310: YES), the first task may be assigned to the second resource (step S320), and the first computing path and the first path information may be updated (step S330). In an exemplary embodiment, when the second resource is still unavailable (step S310: NO), the first task remains assigned to the first resource, and the first task is performed by the first resource.

As illustrated in FIG. 12, a first task TK21 includes several operations OP21, OP22, OP23, OP24, OP25 and OP26 that are sequentially performed, and a second task TK22 includes several operations OP31, OP32 and OP33 that are sequentially performed. In addition, a time interval during which the first task TK21 is performed and a time interval during which the second task TK22 is performed partially overlap.

In an initial operation time, the second task TK22 begins first and is assigned to the DSP. After the initial operation time, the first task TK21 begins and is assigned to the GPU. For example, the second task TK22 may be performed by receiving data IDAT3, by performing the operations OP31, OP32 and OP33 by the DSP, and by outputting data ODAT3. For example, the DSP performs operation OP31 on data IDAT3 to generate a first result, operation OP32 on the first result to generate a second result, and operation OP33 on the second result to generate ODAT3. A part of the first task TK21 may be performed by receiving data IDAT2, and by performing the operations OP21 and OP22 by the GPU. For example, the GPU performs operation OP21 on data IDAT2 to generate a third result and operation OP22 on the third result to generate a fourth result.

Since the second task TK22 is completed first, the DSP becomes available before the first task TK21 is completed. In addition, a priority of the DSP may be higher than a priority of the GPU for the first task TK21. For example, when the operating environment corresponds to the low power mode, or when the first task TK21 corresponds to a low power preference task or a task required to have low power consumption, the DSP may have a priority higher than that of the GPU. Thus, the first task TK21 is assigned to the DSP, and a first computing path CP21 and first path information for the first task TK21 is changed or updated in real-time or during runtime. For example, the DSP performs operation OP23 on the fourth result output by the GPU to generate a fifth result, the DSP performs operation OP24 on the fifth result, etc. A second computing path CP22 and second path information for the second task TK22 that is already completed is maintained.

The first computing path CP21 for the first task TK21 is changed. The first task TK21 is performed by different types of the resources GPU and DSP, and the operations OP23, OP24, OP25 and OP26 are performed by the DSP after the operation OP22 based on the changed first computing path. Thus, a data output format of the GPU and a data input format of the DSP are set to the most optimized or best-fitted data representation format for the DSP based on data representation information for the DSP.

According to exemplary embodiments, an operation IOP21 for changing the data output format of the GPU may be automatically inserted, an output operand of the GPU may be changed, the special function register 150 may be set, the dedicated interface FCON may be provided, the instructions RD and WR may be provided, or two or more schemes described above may be combined so that the data output format of the GPU and the data input format of the DSP are matched with each other.

The rest or remainder of the first task TK21 may be performed by performing the operations OP23, OP24, OP25 and OP26 by the DSP, and by outputting data ODAT2. For example, the DSP may perform operation OP26 on an output of operation OP25 to generate ODAT2.

Figure 13:
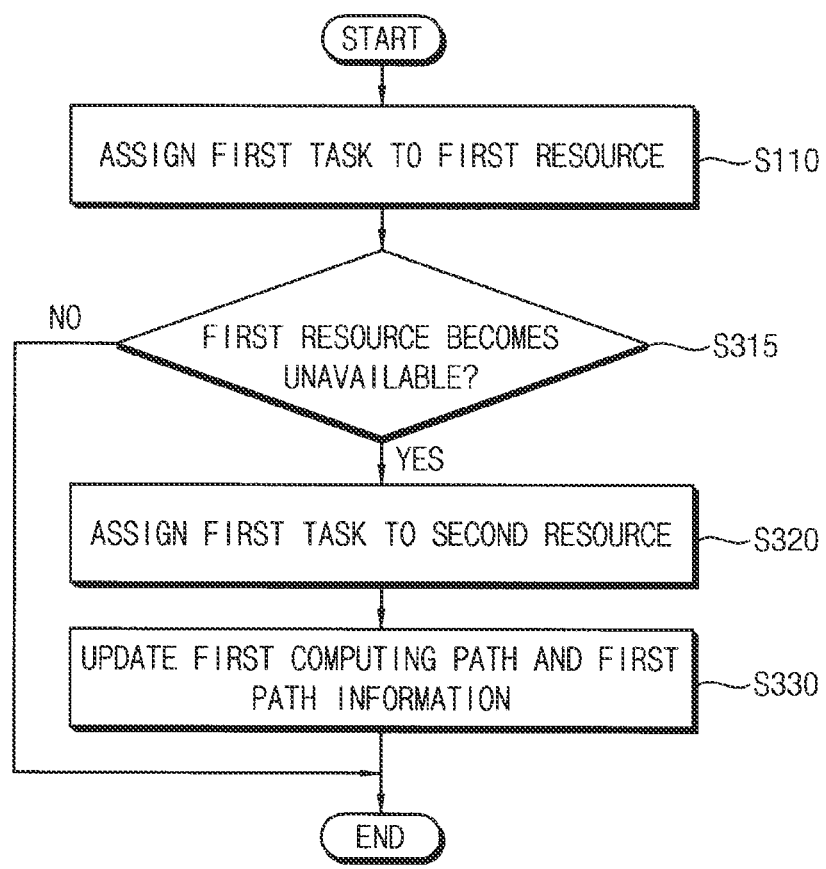
FIG. 13 is a flow chart illustrating another example of changing a computing path and path information in FIG. 10.
Figure 14:
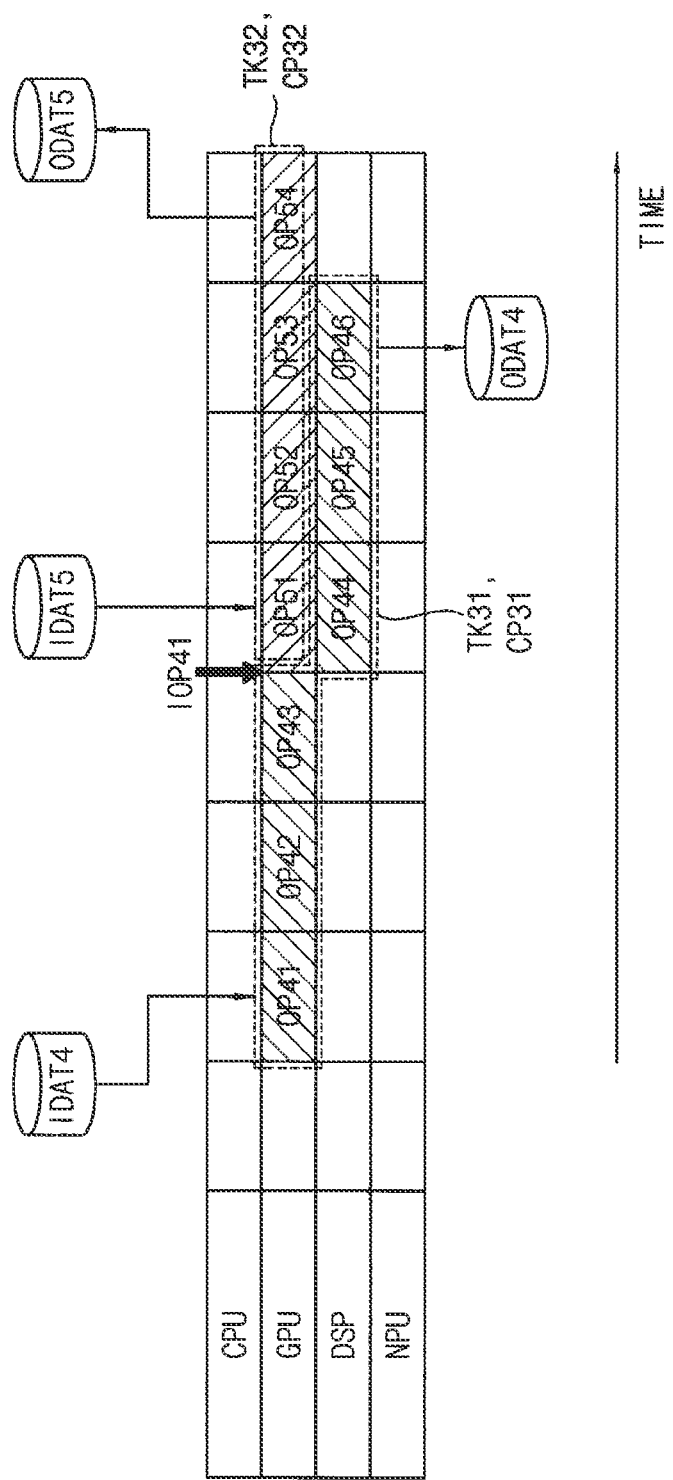
FIG. 14 is a diagram for describing an operation of changing a computing path and path information of FIG. 13.

FIG. 13 is a flow chart illustrating another example of changing a computing path and path information in FIG. 10. FIG. 14 is a diagram for describing an operation of changing a computing path and path information of FIG. 13.

Referring to FIGS. 10, 13 and 14, before changing the first computing path and the first path information (step S300), the first task may be assigned to a first resource (step S110).

When changing the first computing path and the first path information (step S300), it may be checked whether the first resource becomes unavailable (step S315). When the first resource becomes unavailable (step S315: YES), the first task is assigned to the second resource (step S320), and the first computing path and the first path information are updated (step S330). When the first resource is still available (step S315: NO), the first task remains assigned to the first resource, and is performed by the first resource.

As illustrated in FIG. 14, a first task TK31 includes several operations OP41, OP42, OP43, OP44, OP45 and OP46 that are sequentially performed, and a second task TK32 includes several operations OP51, OP52, OP53 and OP54 that are sequentially performed. In addition, a time interval during which the first task TK31 is performed and a time interval during which the second task TK32 is performed partially overlap.

In an initial operation time, the first task TK31 begins first and is assigned to the GPU. For example, a part of the first task TK31 is performed by receiving data IDAT4, and by performing the operations OP41, OP42 and OP43 by the GPU.

The second task TK32 begins and is assigned to the GPU before the first task TK31 is completed, and thus the GPU becomes unavailable for the first task TK31. For example, a priority of the second task TK32 may be higher than a priority of the first task TK31, and the second task TK32 may correspond to a task required to have a high performance. Thus, the first task TK31 may be assigned to the DSP, and a first computing path CP31 and first path information for the first task TK31 may be changed or updated in real-time or during runtime. A second computing path CP32 and second path information for the second task TK32 is maintained.

The first computing path CP31 for the first task TK31 is changed. The first task TK31 is performed by different types of the resources GPU and DSP, and the operations OP44, OP45 and OP46 are performed by the DSP after the operation OP43 based on the changed first computing path. Thus, a data output format of the GPU and a data input format of the DSP are set to the most optimized or best-fitted data representation format for the DSP based on data representation information for the DSP.

According to exemplary embodiments, an operation IOP41 for changing the data output format of the GPU may be automatically inserted, an output operand of the GPU may be changed, the special function register 150 may be set, the dedicated interface FCON may be provided, the instructions RD and WR may be provided, or two or more schemes described above may be combined so that the data output format of the GPU and the data input format of the DSP are matched with each other.

The rest or remainder of the first task TK31 are performed by performing the operations OP44, OP45 and OP46 by the DSP, and by outputting data ODAT4. For example, the DSP performs operation OP44 on an output of operation OP43 to generate a first result, performs operation OP45 on the first result to generate a second result, and performs operation OP46 on the second result to generate data ODAT4. In addition, the second task TK32 is performed by receiving data IDAT5, by performing the operations OP51, OP52, OP53 and OP54 by the GPU, and by outputting data ODAT5. For example, the GPU performs operation OP51 on data IDAT5 to generate a third result, performs operation OP52 on the third result to generate a fourth result, performs operation OP53 on the fourth result to generate a fifth result, and performs operation OP54 on the fifth result to generate data ODAT5.

Examples of dynamically changing the computing path are not limited to examples described with reference FIGS. 11, 12, 13 and 14 and may be changed according to exemplary embodiments. For example, the computing path for the heterogeneous resources may be changed based on various resource environments and various operating environments.

In the method of managing a data representation according to exemplary embodiments, the data representation format for each resource may be dynamically and efficiently set based on the path information and the data representation information, and the data representation format for each resource may be changed and updated in real-time or during runtime when the computing path is dynamically changed. Accordingly, data may be efficiently shared by the heterogeneous resources without a memory copy operation, thereby reducing a communication cost.

Figure 15:
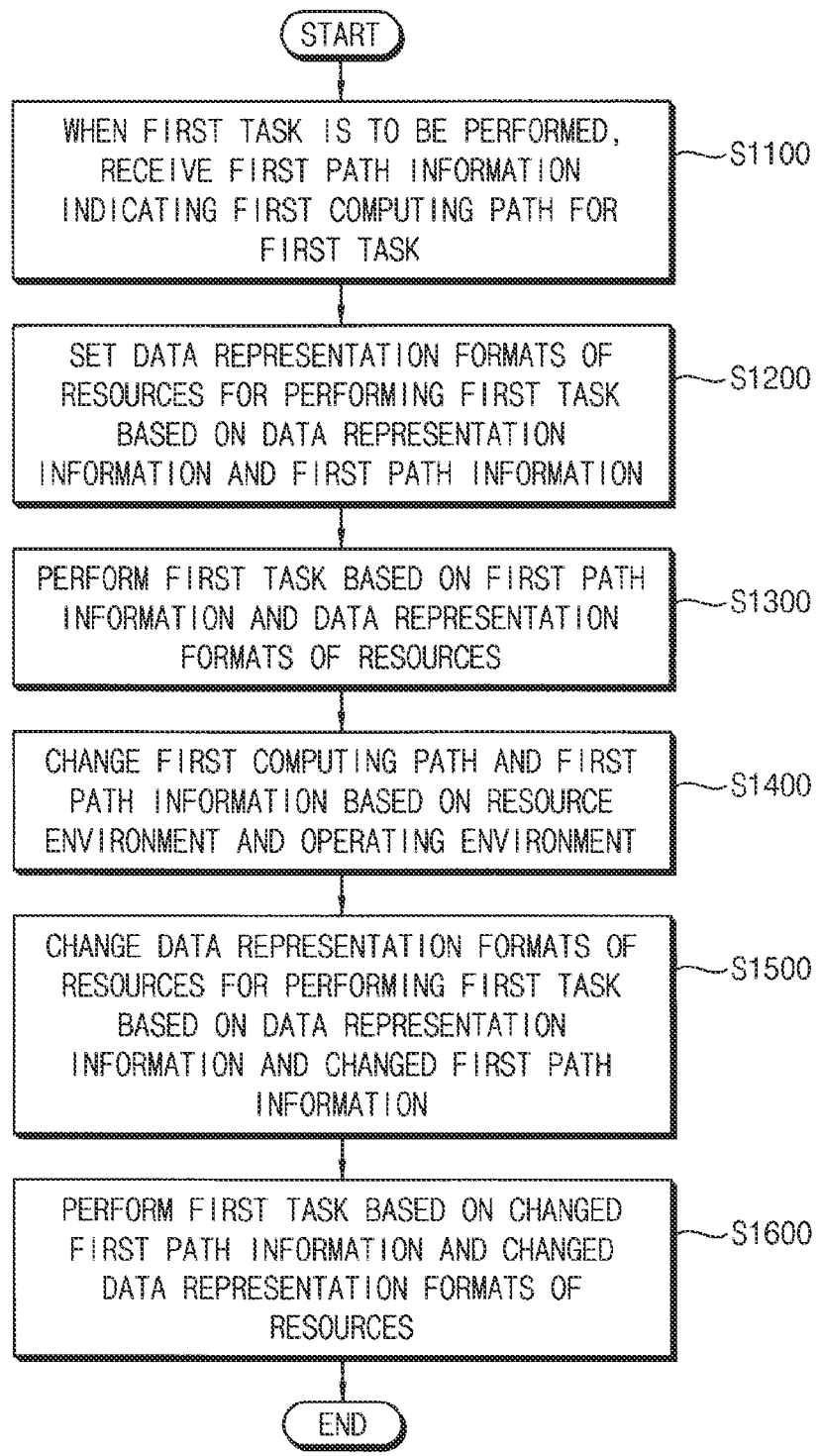
FIG. 15 is a flow chart illustrating a method of processing data for deep learning according to an exemplary embodiment of the inventive concept.

FIG. 15 is a flow chart illustrating a method of processing data for deep learning according to an exemplary embodiment of the inventive concept.

Referring to FIG. 15, in a method of processing data for deep learning according to an exemplary embodiment, steps S1100, S1200 and S1300 in FIG. 15 are substantially the same as steps S1100, S1200 and S1300 in FIG. 9, respectively, and steps S1400 and S1500 in FIG. 15 are substantially the same as steps S300 and S400 in FIG. 10, respectively.

The first task is performed based on the changed first path information and the changed data representation formats of the resources for performing the operations included in the first task (step S1600). For example, as described with reference to FIG. 12, the operations OP21, OP22, OP23, OP24, OP25 and OP26 are performed by the resources GPU and DSP based on the updated path information and the data output format of the resource GPU that is set based on the most optimized or best-fitted data representation format for the later or rear resource, and thus the first task TK21 may be efficiently performed. For example, step S1600 in FIG. 15 may be performed by the plurality of heterogeneous resources 110 in FIG. 2.

In the method of processing data according to exemplary embodiments, the data representation format for each resource may be dynamically and efficiently set based on the path information and the data representation information, the data representation format for each resource may be changed and updated in real-time or during runtime when the computing path is dynamically changed, and the data may be efficiently shared by the heterogeneous resources without a memory copy operation. Accordingly, the deep learning system may have relatively improved or enhanced performance and energy efficiency.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable storage medium. The computer readable storage medium may be any tangible medium that can contain or store a program for use by or in connection with an instruction execution system, apparatus, or device. For example, the computer readable medium may be a non-transitory computer readable medium.

Figure 16:
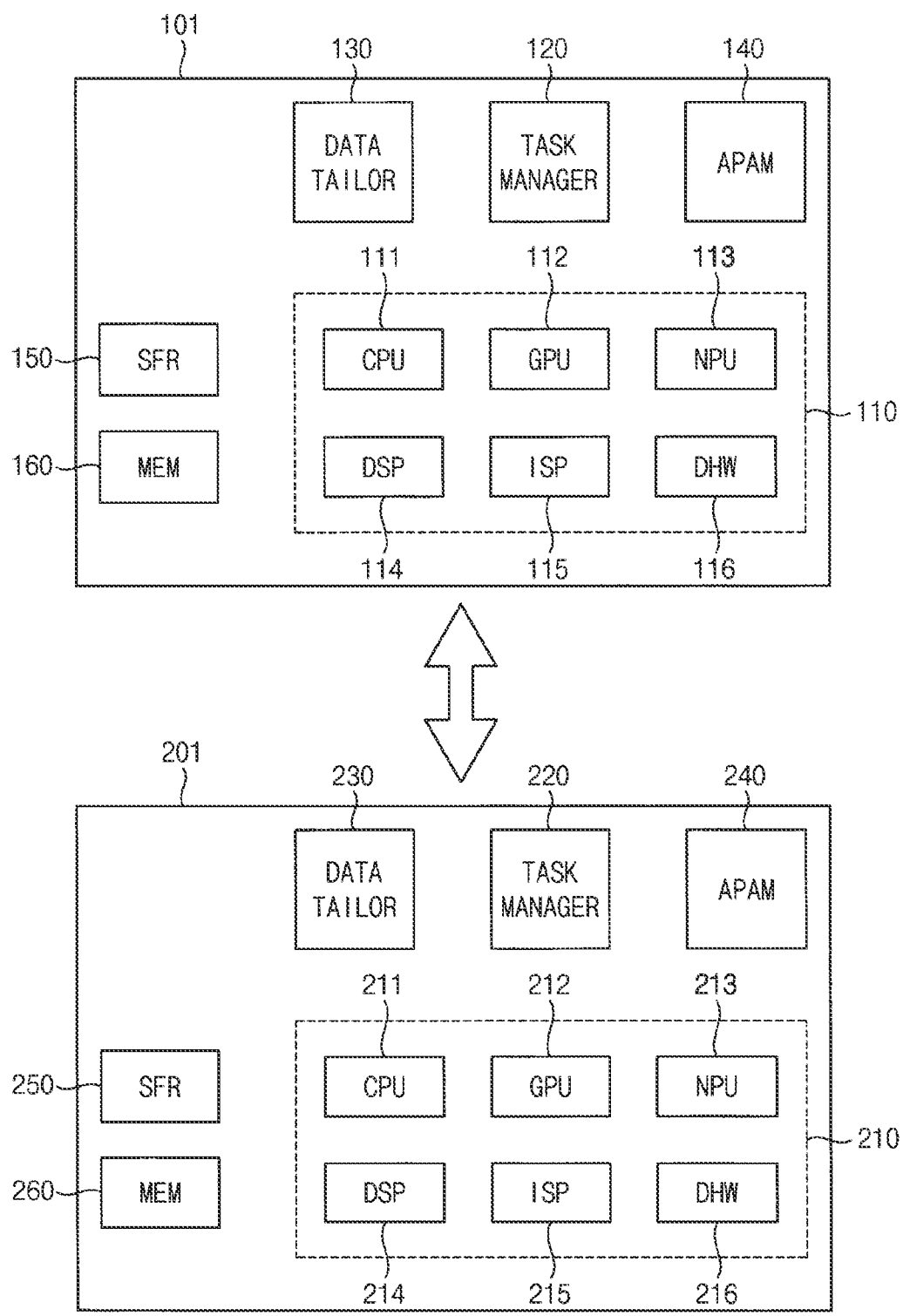
FIG. 16 is a block diagram illustrating a deep learning system according to an exemplary embodiment of the inventive concept.

FIG. 16 is a block diagram illustrating a deep learning system according to an exemplary embodiment of the inventive concept.

Referring to FIG. 16, a deep learning system includes a first electronic device 101 and a second electronic device 201. The deep learning system may be driven by the first electronic device 101 and the second electronic device 201.

The first electronic device 101 includes a plurality of heterogeneous resources 110, a task manager 120, a data tailor 130, an adaptive path manager 140, a special function register 150 and a memory 160. The second electronic device 201 includes a plurality of heterogeneous resources 210, a task manager 220, a data tailor 230, an adaptive path manager 240, a special function register 250 and a memory 260. The plurality of heterogeneous resources 110 and 210 include CPUs 111 and 211, GPUs 112 and 212, NPUs 113 and 213, DSPs 114 and 214, ISPs 115 and 215, and dedicated hardwares 116 and 216.

The plurality of heterogeneous resources 110 and 210, the task managers 120 and 220, the data tailors 130 and 230, the adaptive path managers 140 and 240, the special function registers 150 and 250, and the memories 160 and 260 in FIG. 16 may be substantially the same as the plurality of heterogeneous resources 110, the task manager 120, the data tailor 130, the adaptive path manager 140, the special function register 150 and the memory 160 in FIG. 2, respectively.

In an exemplary embodiment, some of the heterogeneous resources (e.g., 111, 112, 113, 114, 115 and 116) are included in the first electronic device 101, and the other heterogeneous resources (e.g., 211, 212, 213, 214, 215 and 216) are included in the second electronic device 201. The first electronic device 101 may be an electronic device that directly interacts with a user (e.g., directly controlled by a user). The second electronic device 201 may be physically separated from the first electronic device 101, and may be interoperable with the first electronic device 101.

In some exemplary embodiments, the first electronic device 101 may be any computing device and/or mobile device, such as a personal computer (PC), a laptop computer, a mobile phone, a smart phone, a tablet computer, a personal digital assistants (PDA), a portable multimedia player (PMP), a digital camera, a camcorder, a music player, a video player, a portable game console, a navigation device, a wearable device, an internet of things (IoT) device, an internet of everythings (IoE) device, a virtual reality (VR) device, an augmented reality (AR) device, etc.

In some exemplary embodiments, the second electronic device 201 may be any computing device and/or mobile device that is interoperable with the first electronic device 101. For example, the second electronic device 201 may be a companion device that depends on the first electronic device 101, such as a wearable device (e.g., a smart watch). Alternatively, the second electronic device 201 may be an in-house server (e.g., a home gateway) that controls an IoT device and/or an IoE device, or an outside server (e.g., a cloud server).

The inventive concept may be applied to various devices and systems that include the deep learning, ANN and/or machine learning systems. For example, the inventive concept may be applied to systems such as be a mobile phone, a smart phone, a tablet computer, a laptop computer, a PDA, a PMP, a digital camera, a portable game console, a wearable system, an IoT system, a VR system, an AR system, etc.

The foregoing is illustrative of exemplary embodiments of the inventive concept and is not to be construed as limiting thereof. Although a few exemplary embodiments have been described, those skilled in the art will readily appreciate that many modifications are possible in the exemplary embodiments without materially departing from the present disclosure. Accordingly, all such modifications are intended to be included within the scope of the present disclosure.

What is claimed is:

1. A method of processing data for a deep learning system, the method comprising:
   receiving path information indicating a computing path for a task including two or more operations, the computing path including a sequence of the two or more operations and a driving sequence of two or more heterogeneous resources for performing the two or more operations;
   performing, using the two or more heterogeneous resources, the task based on the path information and a data representation format for each of the two or more heterogeneous resources; and
   when one of the two or more heterogeneous resources is changed, changing the data representation format based on data representation information indicating an optimized data representation format for each of the two or more heterogeneous resources to enable the task to be subsequently performed using the two or more heterogeneous resources based on the changed data representation format.

2. The method of claim 1, wherein:
the two or more heterogeneous resources include a first resource of a first type and a second resource of a second type that is different from the first type, and
the two or more operations included in the task include a first operation and a second operation that are sequentially performed.

3. The method of claim 2, wherein performing the task includes:
performing, using the first resource, the first operation; and
performing, using the second resource, the second operation after performing the first operation.

4. The method of claim 3, wherein changing the data representation format includes:
setting a data output format of the first resource and a data input format of the second resource such that the data output format of the first resource and the data input format of the second resource are matched with each other.

5. The method of claim 4, wherein:
the data representation information includes two or more data representation formats settable for each of the two or more heterogeneous resources, and
when the first resource supports a most optimized data representation format for the second resource, the data output format of the first resource and the data input format of the second resource are set to the most optimized data representation format for the second resource.

6. The method of claim 4, wherein:
the data representation information includes two or more data representation formats settable for each of the two or more heterogeneous resources, and
when the first resource does not support a most optimized data representation format for the second resource, the data output format of the first resource and the data input format of the second resource are set to a second most optimized data representation format for the second resource.

7. The method of claim 4, wherein the data output format of the first resource and the data input format of the second resource are set to be matched with each other by automatically inserting a third operation between the first operation and the second operation for changing the data output format of the first resource.

8. The method of claim 4, wherein the data output format of the first resource and the data input format of the second resource are set to be matched with each other by changing a first output operand of the first resource.

9. The method of claim 4, when the data output format of the first resource and the data input format of the second resource are set to be matched with each other, a data input format of the first resource and the data output format of the first resource become different from each other.

10. The method of claim 4, wherein:
the two or more heterogeneous resources further include a third resource of a third type that is different from the first type and the second type, and
the two or more operations included in the task further include a third operation.

11. The method of claim 10, wherein performing the task further includes:

performing, using the third resource, the third operation after performing the second operation.

12. The method of claim 11, wherein changing the data representation format further includes:
setting a data output format of the second resource and a data input format of the third resource such that the data output format of the second resource and the data input format of the third resource are matched with each other.

13. A method of processing data for a deep learning system, the method comprising:
receiving path information indicating a computing path for a task including two or more operations, the computing path including a sequence of the two or more operations and a driving sequence of two or more resources for performing the two or more operations;
performing, using the two or more resources, the task based on the path information; and
changing the computing path and the path information based on resource environment information and operating environment information, the resource environment information indicating whether each of the two or more resources is available, the operating environment information indicating an operating state of an electronic device including the one or more resources,
when the resource environment information and the operating environment information indicate a given resource among the two or more resources is not available, the changing changes the driving sequence to exclude the given resource to enable the task to be subsequently performed based on the changed driving sequence.

14. The method of claim 13, wherein:
the two or more resources include a first resource of a first type and a second resource of a second type that is different from the first type, and
the two or more operations included in the task include a first operation and a second operation that are sequentially performed.

15. The method of claim 14, wherein changing the computing path and the path information includes:
when the first and second operations are assigned to the first resource, and when the second resource having a priority higher than that of the first resource becomes available after the first operation is completed and before the second operation starts, assigning the second operation to the second resource.

16. The method of claim 14, wherein changing the computing path and the path information includes:
when the first and second operations are assigned to the first resource, and when the first resource becomes unavailable after the first operation is completed and before the second operation starts, assigning the second operation to the second resource.

17. The method of claim 14, further comprising:
changing a data representation format based on the changed path information and data representation information indicating an optimized data representation format for each of the two or more resources.

18. The method of claim 17, wherein changing the data representation format includes:
when the first operation and the second operation are assigned to the first resource and the second resource, respectively, setting a data output format of the first resource and a data input format of the second resource such that the data output format of the first resource and the data input format of the second resource are matched with each other.

19. The method of claim 18, wherein:

the data representation information includes two or more data representation formats settable for each of the two or more resources, and when the first resource supports a most optimized data representation format for the second resource, the data output format of the first resource and the data input format of the second resource are set to the most optimized data representation format for the second resource.

20. The method of claim 18, wherein:

the data representation information includes two or more data representation formats settable for each of the two or more resources, and when the first resource does not support a most optimized data representation format for the second resource, the data output format of the first resource and the data input format of the second resource are set to a second most optimized data representation format for the second resource.

* * * * *